A. M. MITCHELL.
PROCESS OF SEPARATING MAGNESIUM FROM DOLOMITE.
APPLICATION FILED JAN. 29, 1919.
1,340,905.
Patented May 25, 1920.
2 SHEETS—SHEET 1.
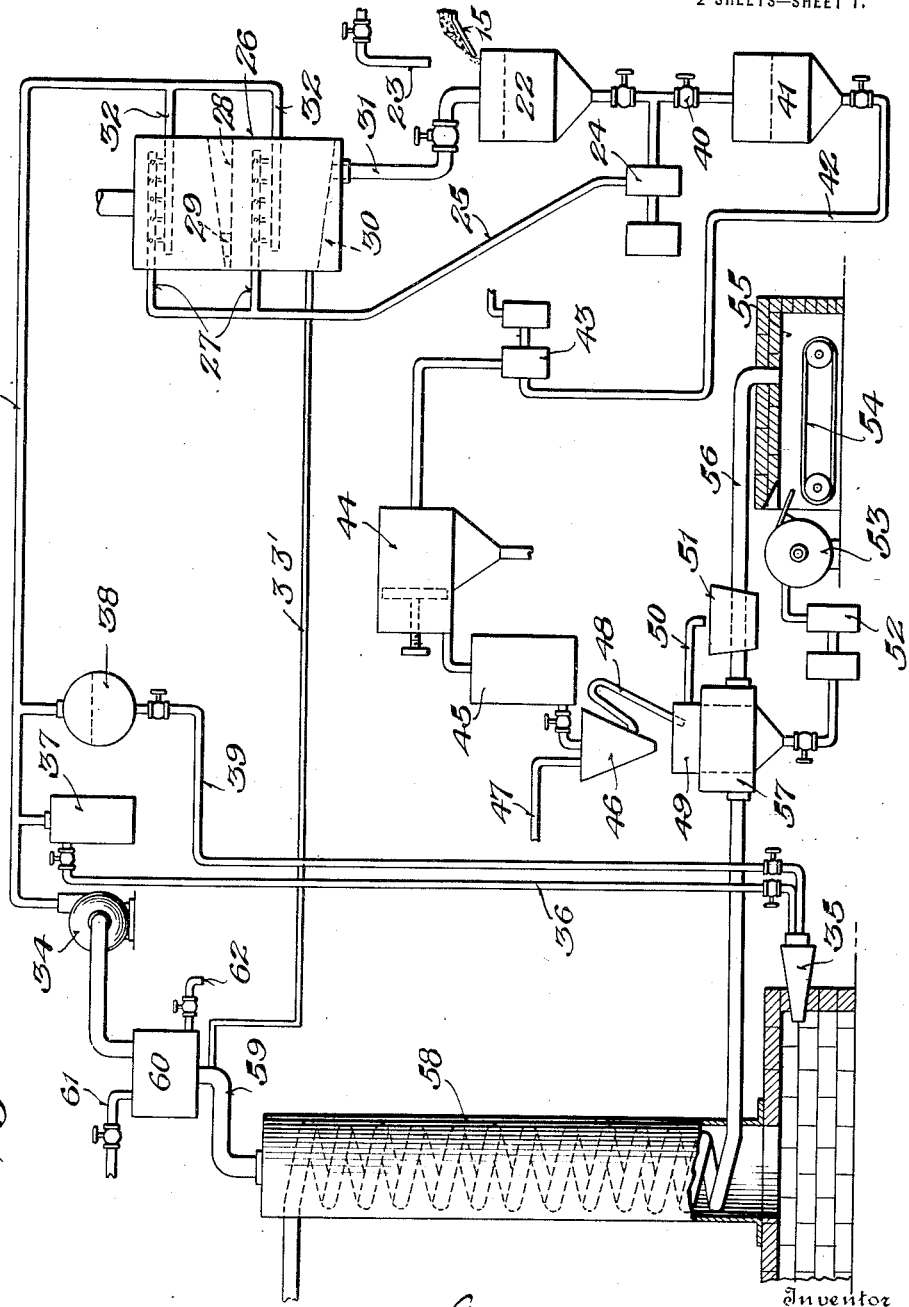
Fig.1.
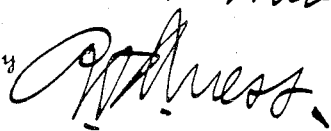

A. M. MITCHELL.
PROCESS OF SEPARATING MAGNESIUM FROM DOLOMITE.
APPLICATION FILED JAN. 29, 1919.
1,340,905.
Patented May 25, 1920.
2 SHEETS—SHEET 2.
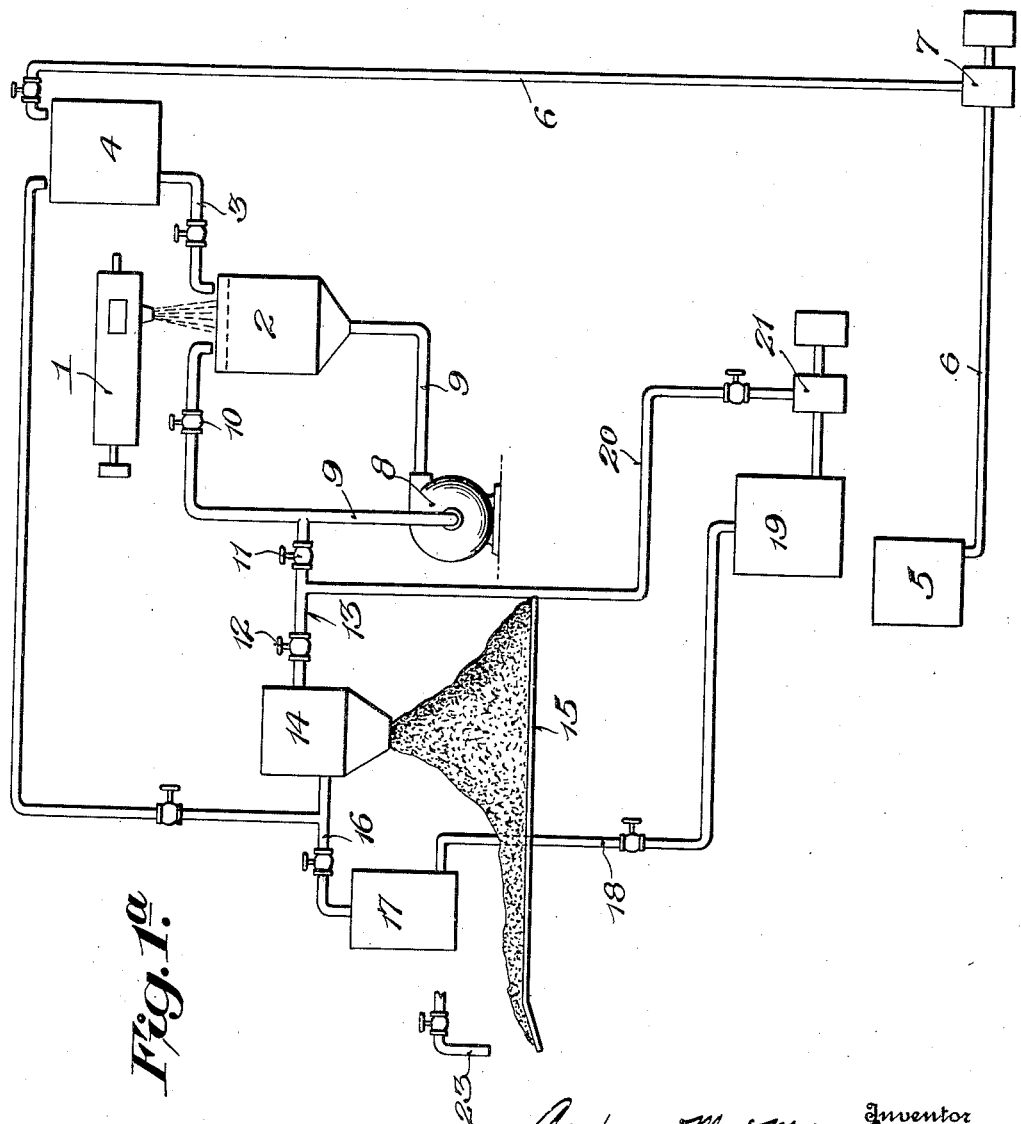
Fig. 1ª

UNITED STATES PATENT OFFICE.

ARDON M. MITCHELL, OF TUCKAHOE, MOHEGAN HEIGHTS, NEW YORK, ASSIGNOR TO MITCHELL AND GRENELLE, INC., A CORPORATION OF NEW YORK.

PROCESS OF SEPARATING MAGNESIUM FROM DOLOMITE.

1,340,905.     Specification of Letters Patent.     Patented May 25, 1920.

Application filed January 29, 1919. Serial No. 273,765.

*To all whom it may concern:*

Be it known that I, ARDON M. MITCHELL, a citizen of the United States, residing at Tuckahoe, Mohegan Heights, in the county of Westchester and State of New York, have invented certain new and useful Improvements in Processes of Separating Magnesium from Dolomite, of which the following is a specification.

This invention relates to certain new and useful improvements in a process of separating magnesium from dolomite, and it has for its principal object to procure such separation without the application of heat and without effecting decomposition of the calcium carbonate.

More specifically, the invention relates to the decomposition of the magnesium carbonate of the dolomite in the presence of water containing an alkaline base, such as caustic soda or potash. The dolomite is introduced in a ground or pulverulent state into the solution while being agitated so that the superficial decomposition product of the magnesium carbonate may readily be removed to permit of further reaction taking place rapidly. Magnesium hydrate resulting from the above is then separated with the calcium carbonate, which is unaffected, and filtered off therewith from the remaining sodium or potassium carbonate solution. The solid matter is then saturated with carbon dioxid for the production of magnesium carbonate.

The invention, therefore, further resides in the subsequent steps and series of steps for effecting carbonation of the solid matter as hereinafter described and claimed, reference being had to the accompanying drawings wherein:—

Figures 1 and 1ª illustrate in diagram an apparatus with which my process may efficiently be practised.

Describing my process more in detail and making reference to the drawings, the dolomite is ground or pulverized in a tube mill 1 and discharged in an underlying tank 2 containing a caustic alkali solution of approximately 20° B., such solution being composed of water and an alkaline base of either caustic soda or potash. This solution is delivered to the tank 2 by a valve controlled conduit 3 from a reservoir 4, the supply of which is replenished from a tank 5, containing concentrated caustic solution, by means of piping 6 and an interposed pump 7. The caustic solution and dolomite in the tank 2 are agitated, as by the circulating pump 8 and piping 9 permitting the superficial decomposition of the magnesium carbonate content to expedite further reaction in converting the magnesium carbonate $MgCO_3$ of the dolomite into magnesium hydrate $Mg(OH)_2$, leaving the calcium carbonate $CaCO_3$ unaffected. The caustic solution becomes normal sodium or potassium carbonate solution, and the magnesium hydrate or hydrated magnesium oxid, being insoluble, settles in the tank 2 with the unaffected calcium carbonate.

The valve 10 in piping 9 is then closed and valves 11 and 12 opened whereby the precipitate from tank 2 is carried through pipe 13 into a filter press 14 which deposits the solid matter, composed of $CaCO_3$ and $Mg(OH)_2$, onto a table 15, the expressed solution passing on through pipe 16 into a tank 17 from whence it is drawn off by a pipe 18 and led to a restoring tank 19. Here the sodium carbonate solution is mixed with lime or milk of lime which renders it caustic again. Thus, the solution may be used indefinitely, the tank 19 being connected to the piping 9 through a pipe 20 that includes a pump 21.

The product is now ready for the manufacture of magnesium carbonate either by elutriation or in accordance with the process described and claimed in my patent for process for producing magnesium oxid from dolomite, No. 1273110, July 6, 1918.

The solid matter passes from the table 15 into a mixing tank 22, which is supplied with water from an overhanging pipe 23. The dolomite "milk" consisting of calcium carbonate, magnesium hydroxid and water, is pumped by mechanism 24, from the mixing tank 22, which keeps the solid matter in suspension, through piping 25 to a carbonating chamber 26.

The pipe 25 terminates in a pair of relatively superposed branches 27 which lead into the chamber and are provided with series of jet openings designed to distribute the milk in small streams. The chamber is divided between the branches 27 by a partition floor 28 which inclines to one side of the chamber and communicates at its lower side through opening 29, with the lower compartment which has a floor 30 inclining to the opposite side of the chamber. The lower side of this floor is formed with an outlet from which pipe 31 leads to return the carbonated liquid back into the mixing chamber. Underlying each branch pipe 27 is a second branch pipe 32 from a carbon dioxid supply pipe 33. The gas, in issuing from the branch pipes 32, strikes the streams or jets of dolomite milk and breaks them up into a fine spray or mist, thus affording a large superficial area of contact whereby the absorption of the gas by the milk is very efficient. The saturated solution is then returned through pipe 31 to the mixer 22 and again pumped through pipe 25 to the branch conduits 27 for being again broken up by the carbon dioxid gas.

This gas is preferably the waste gas from the kiln or furnace employed in the manufacture of insulating material described and claimed in my patent application, Serial Number 86,186, and allowed June 5, 1918. The kiln or furnace employed in this process is indicated at 58, the $CO_2$ passing out through a flue 59, in the top, to a scrubber 60 having a water inflow 61 and an outlet 62. Here the gas is purified before it passes through piping 33 to the branch or jet pipes 32. A blower 34 is interposed in this pipe line 33 for increasing the pressure of the gas therein.

The burner 35 for the furnace is supplied with carbon dioxid from pipe 33 for atomizing the fuel oil as it discharges from the burner, being connected therewith by a pipe 36 and a compression tank 37. A kerosene or other fuel tank 38 is connected to the burner through pipe 39 and also to the pipe 33 whereby the pressure of the gas is also utilized to force the fuel to the burner.

The $CO_2$ gas not absorbed by the dolomite milk is drawn back into the scrubber through pipe 33', and again used to spray the issuing streams of milk in the carbonating or absorbing chamber 26 until the milk has absorbed its maximum quantity of gas, when the valve 40 will be opened to permit the saturated solution to flow down into a settling tank 41. From this tank the solution is forced through pipe 42, by pump 43, into a filter 44, the resulting solid matter being $CaCO_3$ which may be converted into insulating material in accordance with the process described in my aforesaid application. A portion of this solid matter may be made into milk of lime, after being calcined, for mixing with the sodium carbonate solution in tank 19 for recovering the caustic alkali.

The liquid from the filter 44 contains the acid or bicarbonate of magnesia $H_2Mg(CO_3)_2$ and is delivered into a tank 45 from whence it is carried onto a precipitating tank 46. In this latter tank the solution is boiled by steam being discharged therein from pipe 47, such action effecting a precipitation of the carbonate. By means of a siphon outlet or drain 48 for the precipitating tank an intermittent outflow from the tank is set up at intervals determined by the rate of inflow. From the underlying receiving chamber 49 the clear water is carried off through pipe 50 and trough 51 while the residue ($MgH_2OCO_3$) is drawn off by a pump 52 and passed through a suction press 53 before being delivered onto a drying apron 54. This apron is arranged in a drying room 55 that is heated by hot air delivered thereto by a conduit 56, the latter extending through the furnace or kiln and embodying a jacket 57 which envelops the tank 49 to aid in maintaining the high temperature of the solution therein.

By varying the temperature and time of precipitation in tank 46, the composition and resultant product may be widely varied. It is highly essential and desirable to procure a product of magnesium carbonate free from impurities. To this end, I find that the solution when heated to approximately 155° F. precipitates the impurities usually present, such as iron, alumina and lime and any incidental coloring matter which can then be withdrawn. Upon raising the temperature to boiling point the precipitate will be pure $MgH_2OCO_3$.

Also the physical characteristics of the magnesium carbonate will vary according to the strength of solution and time of exposure to a predetermined temperature. The finished product will be composed of approximately 17.64 parts water and the remainder substantially equal parts of $MgO$ and $CO_2$.

What is claimed is:

1. The process of treating dolomite, consisting in pulverizing the dolomite and mixing it with a caustic solution for effecting decomposition of the magnesium carbonate and leaving the calcium carbonate unaffected.

2. The treatment of dolomite consisting in pulverizing the dolomite and mixing with it an alkaline hydroxid that does not react to form a compound with the calcium element.

3. The process for separating magnesium from dolomite, consisting in mixing finely ground dolomite in a solution of alkali metal hydroxid at normal temperature to obtain a precipitate of magnesium hydroxid.

4. The process of separating magnesium from dolomite, consisting in mixing finely ground dolomite in a solution of alkali metal hydroxid at normal temperature to obtain a precipitate of magnesium hydroxid, and passing carbon dioxid through the precipitate to saturate the same.

5. The process for separating magnesium from dolomite, consisting in mixing finely ground dolomite in a solution of alkali metal hydroxid at normal temperature to obtain a precipitate of magnesium hydroxid, filtering the precipitate, adding water thereto to form a milk, and saturating the milk with carbon dioxid.

6. The process for separating magnesium from dolomite, consisting in mixing finely ground dolomite in a solution of alkali metal hydroxid at normal temperature to obtain a precipitate of magnesium hydroxid, filtering the precipitate, adding water thereto to form a milk, discharging the milk in small jets over jets of carbon dioxid whereby the gas will break up the jets of milk into a fine spray for saturating the milk with the gas, filtering out the calcium carbonate, and precipitating $MgCO_3H_2O$ from the remaining solution.

7. The process for separating magnesium from dolomite, consisting in mixing finely ground dolomite in a solution of alkali metal hydroxid at normal temperature to obtain a precipitate of magnesium hydroxid, filtering the precipitate, adding water thereto to form a milk, discharging the milk in small jets over jets of carbon dioxid whereby the gas will break up the jets of milk into a fine spray for saturating the milk with the gas, filtering out the calcium carbonate, passing steam through the remaining solution to effect a precipitate, and finally in drying the precipitate.

8. The process for separating magnesium from dolomite, consisting in mixing finely ground dolomite in a solution of alkali metal hydroxid at normal temperature to obtain a precipitate of magnesium hydroxid, filtering the precipitate, adding water thereto to form a milk, discharging the milk in small jets over jets of carbon dioxid whereby the gas will break up the jets of milk into a fine spray for saturating the milk with the gas, filtering out the calcium carbonate, and precipitating the impurities by the application of open steam.

9. The process of separating magnesium from dolomite, consisting in mixing the latter with a caustic alkali solution, expressing the liquid from the solid matter in solution, adding water to the precipitate to form a milk, discharging the milk in jet form within a chamber, and supplying the latter with a carbon dioxid gas to saturate the same therewith.

10. The process of separating magnesium from dolomite, consisting in mixing the latter with a caustic alkali solution, expressing the liquid from the solid matter in solution, adding water to the precipitate to form a milk, discharging the milk in jet form within a chamber, issuing jets of carbon dioxid gas against the discharging milk to saturate the same with the gas, extracting the liquid from the gas-saturated solution, and boiling the extracted solution.

11. The process of separating and hydrating magnesium from dolomite by mixing finely ground dolomite with alkali metal hydroxid, separating the liquid from the solid matter, causticizing and returning the filtered liquor for mixing again with fresh dolomite, and removing and treating the precipitate with carbon dioxid.

In testimony whereof I affix my signature.

ARDON M. MITCHELL.